Nov. 7, 1939.     H. O. KAUFFMANN     2,178,587
DECOLORIZING SUGAR SOLUTIONS
Filed Feb. 17, 1936
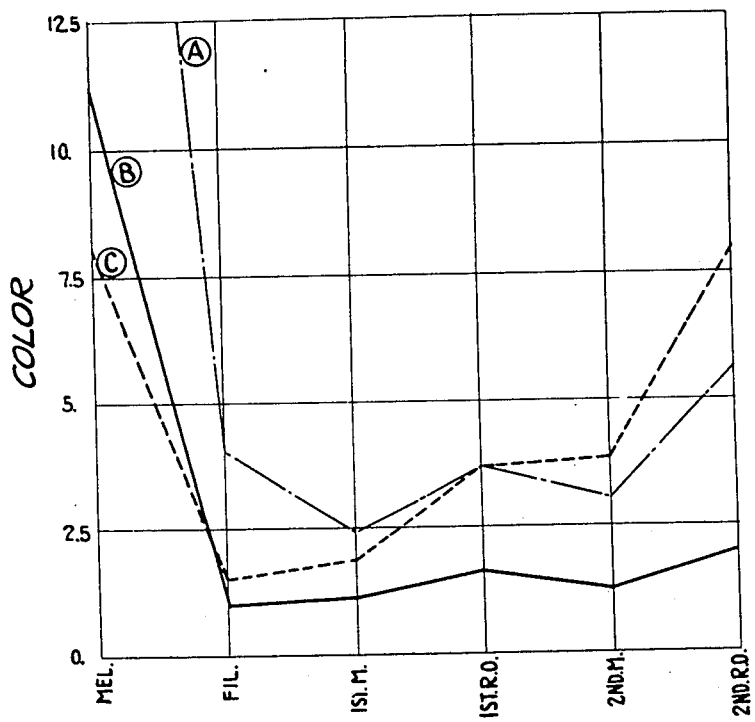
Fig.1.
Fig.2.
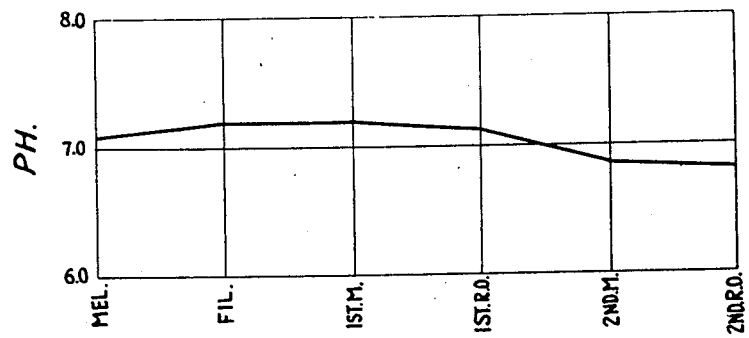
INVENTOR
Hans O. Kauffmann.
BY
Bean, Brooks, Buckley+Bean.
ATTORNEYS Patented Nov. 7, 1939

2,178,587

UNITED STATES PATENT OFFICE 2,178,587

DECOLORIZING SUGAR SOLUTIONS

Hans O. Kauffmann, Buffalo, N. Y., assignor to Buffalo Electro-Chemical Company, Inc., Buffalo, N. Y.

Application February 17, 1936, Serial No. 64,405

4 Claims. (Cl. 127—64)

This invention relates to a process for decolorizing sugar solutions and more particularly to a procedure wherein active chlorine in conjunction with hydrogen peroxide is used to eliminate color from sugar solutions.

Heretofore color has been removed from sugar solutions by passing the heated solution through towers filled with bone char or by adding to the solution a decolorizing or activated carbon in finely divided form and then filtering this carbon from the solution, the spent carbon either being thrown away or regenerated.

It has recently been proposed to decolorize sugar solutions, particularly solutions of affinated sugar, by treating these solutions with active chlorine, for instance, in the form of calcium hypochlorite, that is to say, by adding the calcium hypochlorite to the solution and then removing substantially all the ash forming lime or calcium by means of a phosphatic precipitating and coagulating agent.

A disadvantage of the bone char process is the extremely high initial cost for plant installation. The activated carbon process has been used but is also a high cost process since the activated carbon must be regenerated and eventually discarded or fresh carbon continuously used. The hypochlorite process produces remarkably clear solutions with an excellent color elimination at very low cost. However, it has been found that in treating certain kinds of sugar the colorless sugar solutions produced by the hypochlorite treatment, upon standing, and particularly upon heating, acquire a color which persists, and which, in fact, increases in depth when the solutions of these sugars are heated in the vacuum pan for graining.

The present invention provides a process for decolorizing sugar solutions wherein a minimum of expenditure is required for the plant and wherein the use of expensive bone char and activated carbon is eliminated, and wherein substantially colorless solutions are obtained, that is to say, solutions suitable for use for graining purposes, and wherein there is a minimum of increase of color in the solution upon standing or upon heating.

The process also possesses the advantage that it is adapted for use with highly colored sugar solutions, solutions possessing so much color as 35 to 40 units per hundred Brix on the Horne scale. The process of the present invention also provides a method for decolorizing sugar solutions wherein substantially lesser quantities of hypochlorite are added to the solution than are presently required as a decolorizing agent in the hypochlorite method now known and practiced in the art.

In the production of white sugar, for instance the so-called "granulated" sugar, the decolorized sugar solution may be run to a vacuum pan and boiled under reduced pressure until sugar of the proper grain size is produced, the material in the pan being a heavy wet sludge or paste, usually called a massecuite. After about one-half of the sugar in the original sugar solution has been crystallized therefrom the massecuite is discharged and the sugar separated from the mother liquor, this liquor being generally designated as a "run-off". The sugar first crystallized, since it is obtained from a nearly colorless solution, is of excellent color and constitutes a first grade of sugar. Any color remaining is built up in the run-off and sugar subsequently obtained solely from the run-off possesses a color somewhat inferior to that obtained in the first graining and so on with each subsequent boil, the final run-off being discarded as molasses or being reprocessed.

Since the quality and price of the sugar depends, among other things, upon its color and purity, it will be seen that it is advantageous to produce sugar of very low color and to obtain as many boils as possible from a particular solution.

Referring to the drawing, Fig. 1 is a graph showing the degrees of color of original melts and colors of the filtrate, the massecuites and various run-offs as produced by the process of the present invention and as compared with the color of a typical activated carbon procedure. Fig. 2 is another graph showing the hydrogen ion concentration of these various solutions expressed in terms of pH.

In accordance with the present invention, raw sugar, or affinated sugar, is melted to produce a solution of high sugar concentration of about 65° Brix. Where the raw sugar produces a solution having a color of below about 35 to 40 units per hundred Brix on the Horne scale, it will be unnecessary to wash or affinate the sugar, although such a procedure is recommended; the particular sugar used and the economy of operation will dictate whether or not the raw sugar should be preliminarily affinated.

To eliminate the color from this highly colored, heavy sugar melt or solution, a material containing active chlorine, as for instance, calcium hypochlorite, in the form of bleaching powder or high test hypochlorite containing, for instance, 65 to 75% of active chlorine, is added to the solution, and, in general, about one-tenth, that is, 0.1% to 0.2% of the high test hypochlorite, based upon the weight of solids in the solution, is added with stirring, the temperature of the solution being about 55 to 60° centigrade, although lower temperatures may be used, the action of the hypochlorite or active chlorine being facilitated at the elevated temperatures, temperatures much above that given being not recommended. It will, of course, be understood that the amount of hypochlorite used will be controlled by the original color of the melt and the color desired in the filtrate.

It is advisable to use active chlorine in the form of calcium hypochlorite since by the addition of particular coagulating and precipitating agents it is possible to remove substantially all of the ash forming constituents from the solution and to bring the pH value down and to this end monocalcium phosphate, in the technical form as superphosphate, is added in sufficient quantities to precipitate the calcium of the hypochlorite although other acid or acid salts may be used. Thus far the procedure of the present invention is substantially similar to the hyochlorite process described above and more fully outlined in Sanchez United States Patent No. 1,989,156, it being understood that the hypochlorite may be used in conjunction with the acids and acid salts described therein, the amount of hypochlorite used in the instant process, however, being substantially less than that recommended to decolorize as set forth in said patent for reasons set forth below.

It has been found that the excess of chlorine introduced by means of the hypochlorite in the Sanchez process can be removed normally by the addition of about 0.01% hydrogen peroxide. It is this solution, after dechlorination with hydrogen peroxide, that reacquires color in some instances upon standing or upon heating. Table 1 shows the color of an initially decolorized solution after treatment with the theoretical quantity of hydrogen peroxide for dechlorination and the color of a solution wherein twice the quantity of hydrogen peroxide required for dechlorination has been added. The original melt of pH 7.1 and 60° Brix was treated with 0.12% active chlorine and 0.18% superphosphate as a defecant and filtered after one hour. 25 cc. of this solution was used in determining excess chlorine and required 0.3 cc. $\frac{1}{10}$ Na$_2$S$_2$O$_3$ for titration. The solution was divided into two parts, A and B, and treated as follows:

Table I

| | 10 vol. H$_2$O$_2$ added | Color original melt | Color filtrate |
|---|---|---|---|
| | Cubic centimeters | | |
| Part A | 0.62 | 13.5 | 0.8 |
| Part B | 1.24 | 13.5 | 0.8 |

In accordance with the procedures of the present invention, it has been found that when about five or more times the quantity of hydrogen peroxide required for dechlorination is added to the solution, there is substantially no color increase in the solution when the same is heated or boiled in the vacuum pans. This is shown clearly in Fig. 1, graph B. In accordance with the procedure of the present invention, therefore, it is recommended that about 0.075% or more of hydrogen peroxide, based upon the solids in the solution, should be added in order to prevent recurrence of color and in order to obtain light colored massecuites and run-offs. This quantity of hydrogen peroxide may be added to the solution containing the hypochlorite and defecant and prior to filtering the solution, or may be added after the solution is filtered or when the solution is run to the vacuum pans or storage or heating vats.

Referring to Fig. 1, graph B, it will be noticed that by the addition of about 0.08% of active chlorine as high test hypochlorite and an equivalent amount of superphosphate (about 0.12%) to an affinated sugar solution of color of 11 units per hundred Brix on the Horne scale, an amount of decolorant insufficient of itself to give a good decolorization, and 0.1% hydrogen peroxide 100 volume also added after agitation for a short time at an elevated temperature, for instance, about 15 to 20 minutes at about 50° C., and the solution filtered, a clear sparkling sugar solution is obtained of the color of about 0.80. When this solution was run to the vacuum pans and boiled down, color of the first massecuite was substantially the same, namely, 0.83, the color of the first run-off having increased slightly to about 1.3. The second massecuite had a color of about 1.0, while the second run-off had a color of about 2.0. The color of the sugar obtained was of very high grade and four boils could be obtained before discarding as molasses.

Graph C shows the average color obtained by the well known active carbon process. It will be noted that the color of the massecuites and run-offs increases materially from that of the original filtrate, the first run-off having a color increase of from 1.25 for the original filtrate to about 3.70 for first run-off, the color of the first run-off obtained from a solution treated in accordance with the present invention having a color of about 1.3. The second run-off in the active carbon process (graph C) has increased in color to such an extent (about 8.0) that the solution cannot be boiled and further amounts of high grade white granulated sugar obtained. In the process of the present invention, however, graph B shows a color for the second run-off of about 2.0, a color sufficiently low so that further white sugar may be obtained therefrom by subsequent boils.

Graph A represents the colors of the various solutions and massecuites as obtained from treating a sugar solution of color 30 in accordance with the processes of the present invention.

Fig. 2 is a graph of the pH of the melt, filtrate, massecuites and run-offs in a typical procedure of the present invention, the control of this pH being more fully described in copending application Serial No. 64,406 filed concurrently herewith.

It will be seen that in accordance with the present invention considerably less ash forming material is added to the solution as the amount of hypochlorite used is less, the solution can possess a higher sugar content and as the temperature is elevated the solutions possess good mobility. The filtration rate is excellent as the mobility, due to the temperature of operation, is good and since the amount of precipitate is relatively small. The process is adapted for all types of sugar as there is no fear of color return and all operations may be performed hot. The excess of peroxide over that required to eliminate excess of chlorine aids in decolorizing and prevents color return and it is possible to obtain white sugar from the fourth or even fifth boil.

What is claimed is:

1. The method of decolorizing sugar solutions which comprises adding a hypochlorite and precipitant to the solution in amount to substantially decolorize the same and adding hydrogen peroxide thereto to the extent of at least one-half the amount of hypochlorite and precipitant based upon the solids in the solution, and thereafter filtering the solution.

2. The method of decolorizing sugar solutions which comprises adding a hypochlorite and precipitant to the solution in amount to substantially decolorize the same and adding hydrogen peroxide thereto to the extent of at least one-half the amount of hypochlorite and precipitant based upon the solids in the solution, and heating the solution to elevated temperature.

3. The method of decolorizing sugar which comprises preparing an aqueous solution of affinated sugar of high sugar content, treating the solution at a moderately elevated temperature with a hypochlorite and a precipitant in amounts sufficient to substantially decolorize the solution, agitating the solution in order to permit the decolorizing action to proceed and then adding an amount of hydrogen peroxide equivalent to about five times that required to dechlorinate the solution whereby color return in the solution is prevented.

4. The method of decolorizing sugar which comprises preparing an aqueous solution of affinated sugar of high sugar content, treating the solution at a moderately elevated temperature with a hypochlorite and a precipitant in amounts sufficient to substantially decolorize the solution, agitating the solution in order to permit the decolorizing action to proceed, adding an amount of hydrogen peroxide equivalent to about five times that required to dechlorinate the solution whereby color return in the solution is prevented, and thereafter filtering the solution.

HANS O. KAUFFMANN.